(No Model.)
M. PAYNE.
SULKY.
No. 507,839. Patented Oct. 31, 1893.
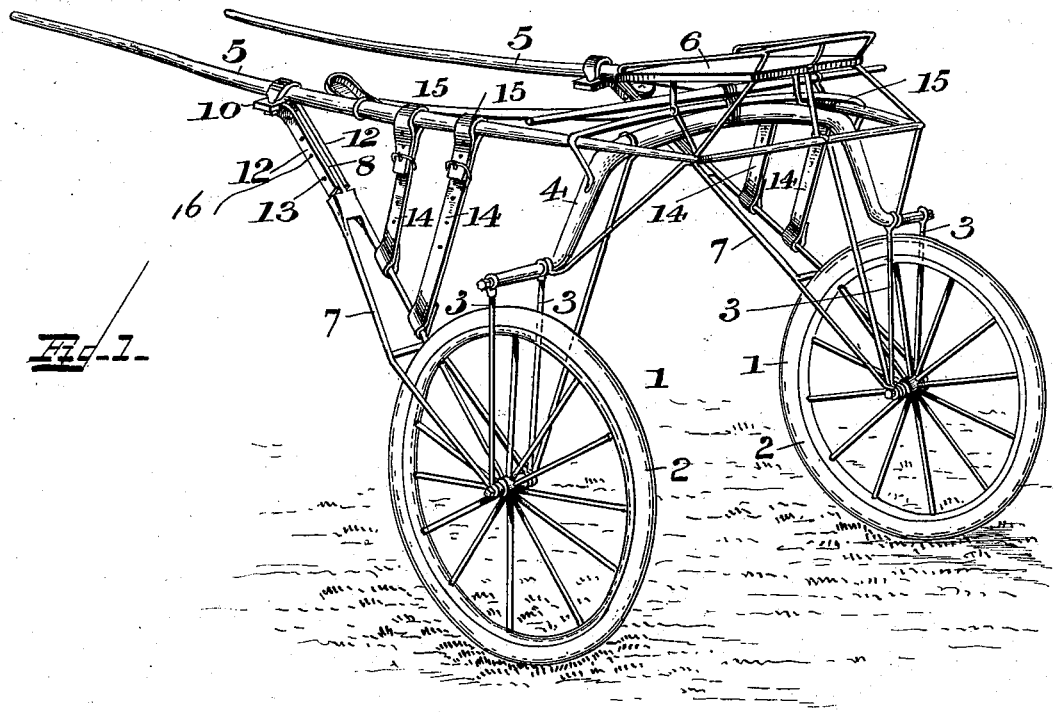
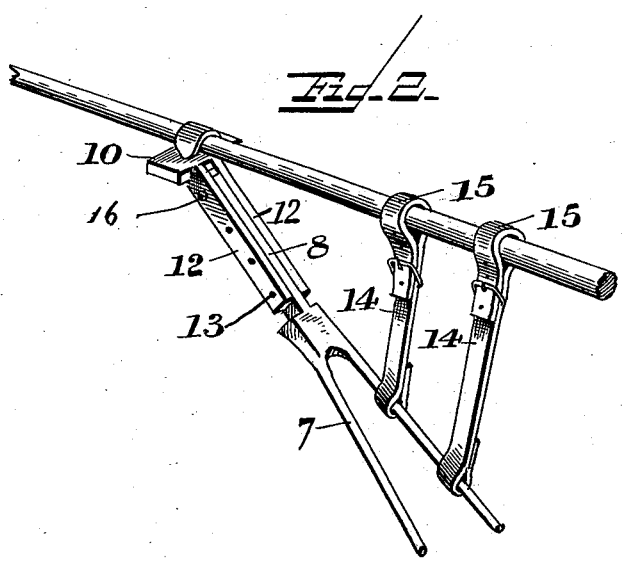
WITNESSES:
F. L. Ourand.
Jo. L. Coombs.
INVENTOR:
Martin Payne,
by Louis Bagger & Co.
Attorneys

UNITED STATES PATENT OFFICE.

MARTIN PAYNE, OF TROY, NEW YORK.

SULKY.

SPECIFICATION forming part of Letters Patent No. 507,839, dated October 31, 1893.

Application filed February 15, 1893. Serial No. 462,416. (No model.)

*To all whom it may concern:*

Be it known that I, MARTIN PAYNE, a citizen of the United States, and a resident of Troy, in the county of Rensselaer and State of New York, have invented certain new and useful Improvements in Sulkies; and I do hereby declare that the following is a full, clear, and exact description of the invention, which will enable others skilled in the art to which it appertains to make and use the same, reference being had to the accompanying drawings, which form a part of this specification.

My invention relates to improvements in sulkies or road carts of that class known as bicycle wheel sulkies, which are provided with small supporting wheels with pneumatic tires and in which the driver's seat is elevated above the wheels.

The object of the invention is to provide a novel construction of such sulky in which the wheels and brace connecting the same with the shafts, may be adjusted horizontally with respect to the shaft, whereby the rods or bars which connect the axle with the journals of the wheel, will be kept in a vertical position when different sized draft animals are used. It is also an object to provide the shafts and braces with safety straps by which the braces are prevented from falling down in front of the wheels in case they get broken.

The invention consists in the novel construction and combination of parts hereinafter fully described and claimed.

In the accompanying drawings: Figure 1 is a perspective view of a sulky constructed in accordance with my invention. Fig. 2 is a similar view of a portion of one of the braces and shafts.

In the said drawings, the reference numeral 1 designates the wheels, which are much smaller than those in general use, and are provided with pneumatic tires 2. These wheels are journaled in the lower ends of vertical rods or bars 3, the upper ends of which are journaled on the curved axle 4. Secured to the axle are shafts 5 of any ordinary construction, provided with the usual seat 6.

Mounted upon the journals of the wheels 1, are forwardly extending braces 7, the rear ends of which are bifurcated to embrace said wheels. The front ends of these braces are cut away forming an arm 8, provided with a series of bolt-holes 9.

The numeral 10 designates a clip, which embraces, and is slidable upon the shafts, and its rear end is provided with two rearwardly extending arms 12, provided with bolt-holes 13, adapted to register with the holes in the arms 8 for the reception of bolts 16.

The numerals 14, 14, designate two straps, the upper ends of which are formed into loops 15, which embrace the said shafts. The lower ends of these straps are connected with the braces.

The operation will be readily understood. When an ordinary sized or small draft animal is used, the shafts will be in a horizontal position, and the rods or bars 3, in a vertical position. When however, a larger horse is used, the front ends of the shafts are elevated, the tendency of which is to throw said bars or rods out of vertical line. By removing the bolts which connect the clips with the brace, the latter can be lengthened, whereby such objection will be obviated and the said bars or rods be made to assume a vertical position.

In case of breakage of the braces, the safety straps will hold the same, and prevent them from falling in front of the wheels.

Having thus described my invention, what I claim is—

In a sulky the combination with the wheels and axle, of the bifurcated braces 7, cut away at their forward ends forming arms 8, the slidable clips 10 having rearwardly extending arms 12, and the bolts for adjustably connecting arms 8 and 12 together, substantially as described.

In testimony that I claim the foregoing as my own I have hereunto affixed my signature in presence of two witnesses.

MARTIN PAYNE.

Witnesses:
 CHARLES E. LANSING,
 GEORGE L. HOLCOMB.